(12) United States Patent
Feldbaum (10) Patent No.: US 6,446,206 B1
(45) Date of Patent: *Sep. 3, 2002

(54) METHOD AND SYSTEM FOR ACCESS CONTROL OF A MESSAGE QUEUE

(75) Inventor: Boaz Feldbaum, Haifa (IL)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,104

(22) Filed: Apr. 1, 1998

(51) Int. Cl.[7] ................................................. H04L 9/00
(52) U.S. Cl. ....................................... 713/175; 713/170
(58) Field of Search ................................. 713/200, 201, 713/202, 170, 181, 154, 162, 156, 159; 709/225, 229; 380/30

(56) References Cited

U.S. PATENT DOCUMENTS

| | | | |
|---|---|---|---|
| 4,499,576 A | | 2/1985 | Fraser |
| 4,584,679 A | | 4/1986 | Livingston et al. |
| 4,623,886 A | | 11/1986 | Livingston |
| 4,656,474 A | * | 4/1987 | Mollier et al. ................ 380/23 |
| 4,736,369 A | | 4/1988 | Barzilai et al. |
| 4,769,815 A | | 9/1988 | Hinch et al. |
| 5,063,562 A | | 11/1991 | Barzilai et al. |
| 5,163,131 A | | 11/1992 | Row et al. |
| 5,193,090 A | * | 3/1993 | Filipiak ........................ 370/94 |
| 5,247,676 A | | 9/1993 | Ozur et al. |
| 5,261,002 A | * | 11/1993 | Perlman et al. ................ 380/30 |
| 5,285,445 A | | 2/1994 | Lehnert et al. |
| 5,287,103 A | | 2/1994 | Kasprzyk et al. |
| 5,367,523 A | | 11/1994 | Chang et al. |
| 5,412,717 A | * | 5/1995 | Fischer ........................ 713/156 |

(List continued on next page.)

OTHER PUBLICATIONS

*Microsoft Message Queuing Services: A Guide to Reviewing Microsoft Message Queuing Service Release 1.0*, Microsoft Corporation, Redmond, Washington, 1997.

Comer, Douglas E., *Internetworking With TCP/IP vol. 1: Principles, Protocols, and Architecture*, Chapter 6: Determining an Internet Address at Startup (RARP) and Chapter 18: Client–Server Model of Interaction pp. 83–88, 293–309, Prentice–Hall, Englewood Cliffs, New Jersey, 1991.

(List continued on next page.)

*Primary Examiner*—Gail Hayes
(74) *Attorney, Agent, or Firm*—Leydig, Voit & Mayer, Ltd.

(57) ABSTRACT

A method and system for controlling access to a message queue in a message queuing system utilizes a certificate of a user who sends a message to authenticate the message and uses a directory service of the message queuing system as a trusted entity in the authentication process. The certificate used for message authentication may be an internal certificate issued by the message queuing system or an external certificate issued by a certification authority. The certificate is registered with the directory service of the message queuing system and stored with a security identification (SID) of the user. When the user runs an application which sends a message to a target queue, the sending computer signs the message with a private key associated with the certificate and sends the message with the digital signature and the certificate to the receiving computer. When the receiving message queue (MQ) server receives the message packet, it verifies the digital signature of the message. If the signature is verified, the receiving MQ server queries the message queuing system to obtain the SID associated with the certificate. The MQ server then decides whether the message with the SID should be placed in the target queue by checking a security descriptor of the target queue.

24 Claims, 6 Drawing Sheets

U.S. PATENT DOCUMENTS

| | | | |
|---|---|---|---|
| 5,465,328 A | | 11/1995 | Dievendorff et al. |
| 5,499,297 A | * | 3/1996 | Boebert ..................... 713/159 |
| 5,526,358 A | | 6/1996 | Gregerson et al. |
| 5,526,489 A | | 6/1996 | Nilakantan et al. |
| 5,546,391 A | * | 8/1996 | Hochschild .................. 370/60 |
| 5,555,415 A | | 9/1996 | Allen |
| 5,557,748 A | | 9/1996 | Norris |
| 5,572,522 A | | 11/1996 | Calamvokis et al. |
| 5,572,582 A | | 11/1996 | Riddle |
| 5,627,766 A | | 5/1997 | Beaven |
| 5,758,184 A | | 5/1998 | Lucovsky et al. |
| 5,761,507 A | | 6/1998 | Govett |
| 5,764,625 A | | 6/1998 | Bournas |
| 5,777,987 A | | 7/1998 | Adams et al. |
| 5,778,384 A | | 7/1998 | Provino et al. |
| 5,793,861 A | * | 8/1998 | Haigh ........................ 379/266 |
| 5,812,819 A | | 9/1998 | Rodwin et al. |
| 5,815,667 A | | 9/1998 | Chien et al. |
| 5,819,042 A | | 10/1998 | Hansen |
| 5,828,653 A | * | 10/1998 | Goss .......................... 370/230 |
| 5,835,727 A | | 11/1998 | Wong et al. |
| 5,838,907 A | | 11/1998 | Hansen |
| 5,845,081 A | | 12/1998 | Rangarajan et al. |
| 5,854,901 A | | 12/1998 | Cole et al. |
| 5,864,669 A | | 1/1999 | Osterman et al. |
| 5,872,968 A | | 2/1999 | Knox et al. |
| 5,875,301 A | | 2/1999 | Duckwall et al. |
| 5,875,306 A | | 2/1999 | Bereiter |
| 5,878,056 A | | 3/1999 | Black et al. |
| 5,881,051 A | | 3/1999 | Arrowood et al. |
| 5,901,138 A | | 5/1999 | Bader et al. |
| 5,916,307 A | | 6/1999 | Piskiel et al. |
| 5,920,697 A | | 7/1999 | Masters et al. |
| 5,922,049 A | | 7/1999 | Radia et al. |
| 5,930,479 A | * | 7/1999 | Hall ....................... 395/200.68 |
| 5,956,340 A | | 9/1999 | Afek et al. |

OTHER PUBLICATIONS

Benaloh, Josh et al, *The Private Communication Technology (PCT) Protocol*, Internet Draft, available from http://premium.microsoft.com/msdn/library/bkgrnd/html/pct/hml, Oct., 1995.

Marshall, Martin, "Microsoft Updates Falcon Beta", *Internetweek*, Issue 653, Mar. 10, 1997.

Bowen, Ted Smalley, "Asynchronous Messaging Pushes to the Fore", *Infoworld*, Feb. 23, 1998. Available from http://www.infoworld.com/cgi-bin/displayTC.pl?/980223sbl-async.htm.

Biggs, Maggie, "Applications Released from Platform Confines: Message Queuing Exchanges Data Between Apps Regardless of Platform", *Infoworld*, Feb. 23, 1998. Available from http://infoworld.com/cgi-bin/displayTC.pl?/980223analysis.htm.

*Using MSMQ as an RPC Transport*, Microsoft Corporation, 1997.

Tarjan, Robert Endre, *Data Structures and Network Algorithms*, Chapter 3: Heaps, pp. 33–43, Society for Industrial and Applied Mathematics, Philadelphia, Pennsylvania, 1993.

*Microsoft Message Queue Server 1.0 Release Notes*, Microsoft Corporation, Redmond Washington, 1997.

*Microsoft Message Queue Server: A Guide to Reviewing and Evaluation Microsoft Message Queue Server Beta 2 Release*, Microsoft Corporation, Redmond, Washington, 1997.

Richter, Jeffrey, *Advanced Windows: The Professional Developers Guide to the Win32 API for Windows NT 4.0 and Windows 95*, Chapter 11: Window Messages and Asynchronous Input, pp. 461–528, Microsoft Press, Redmond, Washington, 1997.

Sinha, Alok K., *Network Programming in Windows NT*, Chapter 5: Windows Sockets in Windows NT, pp. 199–299, Addison–Wesley Publishing Company, Reading, Massachusetts, 1996.

Gilman, Len and Schreiber, Richard, *Distributed Computing with IBM MQSeries*, John Wiley & Sons, New York, New York, 1997.

Blakeley, Burnie; Harris, Harry, and Lewis, Rhys, *Messaging & Queuing Using the MQI*, McGraw–Hill Inc., New York, New York, 1995.

Benaloh, et al., *The Private Communication Technology (PCT) Protocol*, Oct. 1995 (visited Feb. 5, 1998) <http://premium.microsoft.com/msdn/library/bkgrnd/html/pct.htm>.

Lam, Richard B. "Shared Memory and Message Queues." Dr. Dobb's Journal on CD–ROM. Mar. 1995. pp. 2–3.*

Newton, Harry. "Newton's Telecomm Dictionary." 8th ed. Flatiron Publishing. 1994. pp. 333 and 870.*

Tanenbaum, Andrew S. Computer Networks. Third Ed. 1996. Prentice Hall, NJ. pp. 577–622, esp. p. 601.*

Blakeley et al., *Messaging and Queuing Using the MQI*, McGraw Hill, Inc.; New York, NY, 1995.

Douglas E. Comer, *Internetting with TCP/IP*, vol. 1: Principles, Protocols and Architecture, Second Edition, Chapter 19, 1991.

IBM. "Data Communication and Inteproduct Communication," 1995, pp. 1–4.

IBM. "MQSeries System Administration," Chapters 11–12, pp. 141–193, Sep. 1997.

Haerder et al. "Concepts for Transaction Recovery in Nested Transactions," ACM. pp. 239–248. 1987.

IBM. "MQSeries Application Programming Guide", Chapter 13, pp. 185–196. Feb. 1998.

Karoui, Ramzi et al. "Asynchronous Nested Transactions for Multi-tier Applications," pp. 1–9. 1999.

Marazakis, M et al. "Tpsim –A Simulator for Transaction Processing Systems," ERCIM News No. 23 –Oct. 1995.

* cited by examiner

METHOD AND SYSTEM FOR ACCESS CONTROL OF A MESSAGE QUEUE

FIELD OF THE INVENTION

This invention relates generally to message queuing systems, and more particularly to access control of a message queue in a message queuing system.

BACKGROUND OF THE INVENTION

A message queuing system implements asynchronous communications which enable an application in a distributed processing network to send messages to, and receive messages from, other applications. A message may contain data in any format that is understood by both the sending and receiving applications. When the receiving application receives a request message, it processes the request according to the content of the message and, if required, sends a response message back to the original sending application. The sending and receiving applications may be on the same machine or on separate machines connected by a network. While messages are in transit between the sending and receiving applications, the message queuing system keeps the messages in holding areas called message queues. The message queues protect messages from being lost in transit and provide a place for an application to look for messages sent to it when it is ready.

In the context of distributed processing, asynchronous communications provide significant advantages over synchronous communications. Communications are synchronous when the sender of a request must wait for a response from the receiver of the request before it can proceed to perform other tasks. If the receiving application is slow or for any reason cannot promptly process the request, a significant amount of time of the sending application will be wasted in waiting. Moreover, with synchronous communications, the sending application must wait for the receiving application to return a response before it can make a request to another application.

In contrast, with asynchronous communications in the form of exchanging messages, an application can send multiple request messages to different receiving applications at one time and can turn immediately to other tasks without having to wait for any of the receiving applications to respond to the request messages. The messages can be sent regardless of whether the receiving applications are running or reachable over the network. The message queuing system is relied upon to ensure that the messages are properly delivered. The asynchronous message delivery also makes it easy to journal the communications and allows a receiving application to prioritize the processing of the messages.

The asynchronous message delivery, however, makes it more difficult to implement message security. It is important for a message queue. (MQ) server to selectively allow or deny permission to users or groups of users to send messages to a given message queue. A conventional way to implement access control for a data file is to use a security descriptor which contains a discretionary access control list indicating which users or groups are given or denied access to the file. When a user attempts to access the file, the credentials of the user are checked against the security descriptor to determine whether the access request should be allowed or denied.

This conventional scheme, however, is not directly applicable in a message queuing system where the communications are asynchronous. A user can run an application that sends a message to a destination queue and then log off before the message reaches the receiving MQ server which maintains the destination queue. In fact, the user can log off even before the message leaves the sending computer. If the message arrives at the receiving server after the user has logged off, the user credentials are no longer available for the receiving server to verify the identity of the user who sent the message.

It has been proposed to implement access control based on a unique security identification (SID) assigned to each user. When a message is sent, the user's SID is added to the message. Upon receiving the message, the receiving server uses the SID as an unambiguous identification of the user who sent the message. The server checks the security descriptor associated with the destination queue to determine whether the user or any of the groups of which the user is a member is permitted to place messages in the queue. The problem with this scheme is that the SID received with the message is not by itself a reliable indication of the true identity of the person who sent the message. This is because a SID has to be known to the public to serve the function of identifying a user. In other words, it is not a secret. Thus, a hacker may hack the sending computer to insert someone else's SID into a message. The SID associated with a message may also be tampered with when the message traverses the network to the receiver.

SUMMARY OF THE INVENTION

In accordance with the present invention, there is provided a method and system for controlling access to a message queue in a message queuing system with asynchronous message delivery. The access control utilizes a user certificate to authenticate a message sent by the user and uses a database of the message queuing system as a trusted entity in the authentication process. When the user runs an application which sends a message to a target queue, a digital signature for the message is generated with a private key associated with a selected certificate of the user. The message is sent with the digital signature and the certificate. When the receiving MQ server receives the message packet, it verifies the digital signature of the message. If the signature is verified, the receiving MQ server queries the database of the message queuing system to obtain the security identification (SID) that is associated with the certificate and therefore identifies the user who sent the message. The MQ server then checks a security descriptor of the target queue to decide whether the message with the SID should be placed in the target queue.

It is a feature of the invention that the certificate used in the message queue access control may be an internal certificate generated by the message queuing system. The use of an internal certificate avoids the need for the user to obtain an external certificate from a certification authority. Alternatively, the user can select to use an external certificate which provides compatibility with other certificate-based authentication operations.

The advantages of the invention will become apparent with reference to the following detailed description when taken in conjunction with the drawings in which:

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Figure 1:
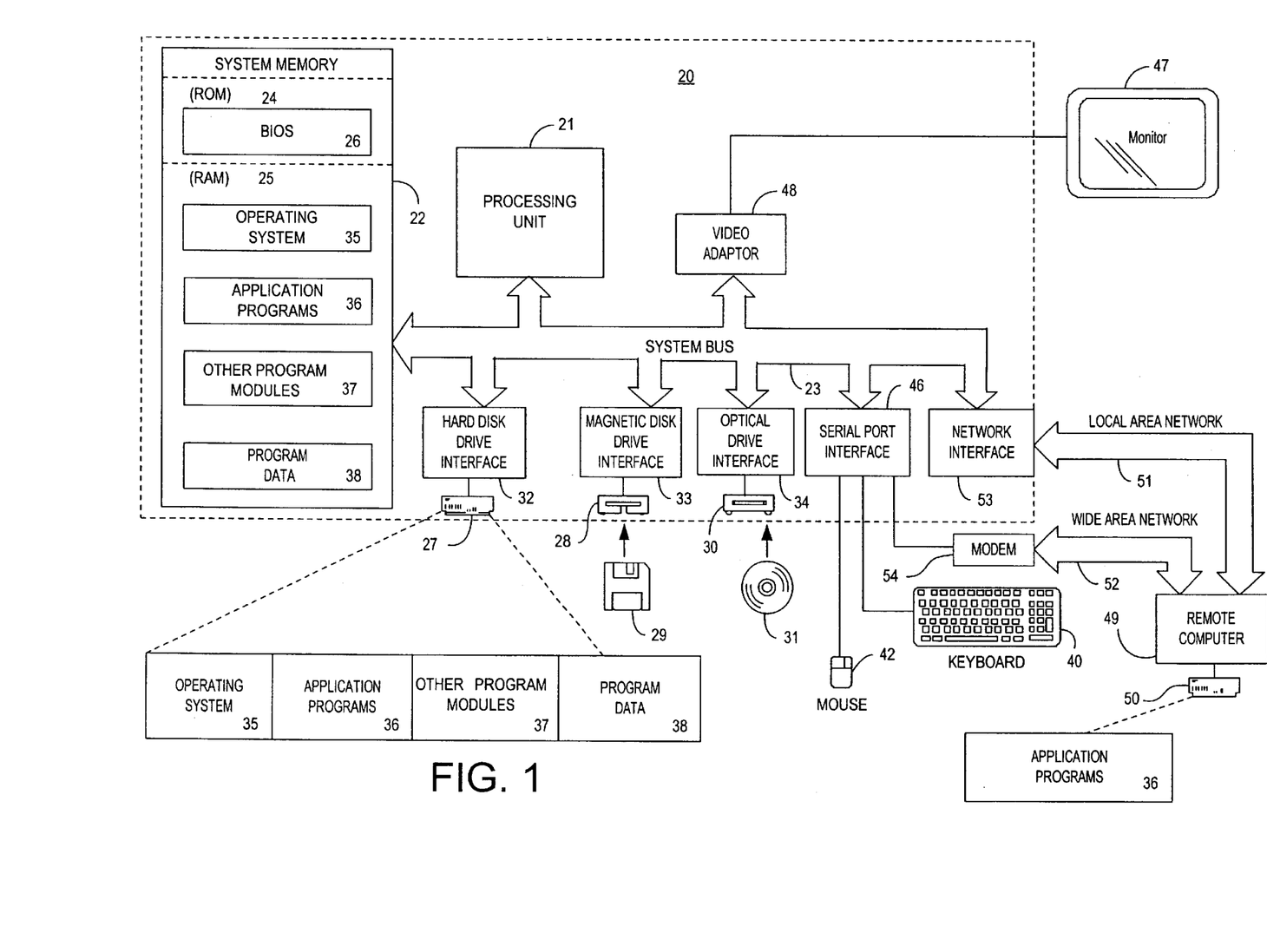
FIG. 1 is a block diagram of a computer system that may be used to implement a method and system for message security in a message queuing system according to the invention.

Turning now to the drawings, FIG. 1 and the following discussion are intended to provide a brief, general, description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that help to transfer information among elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
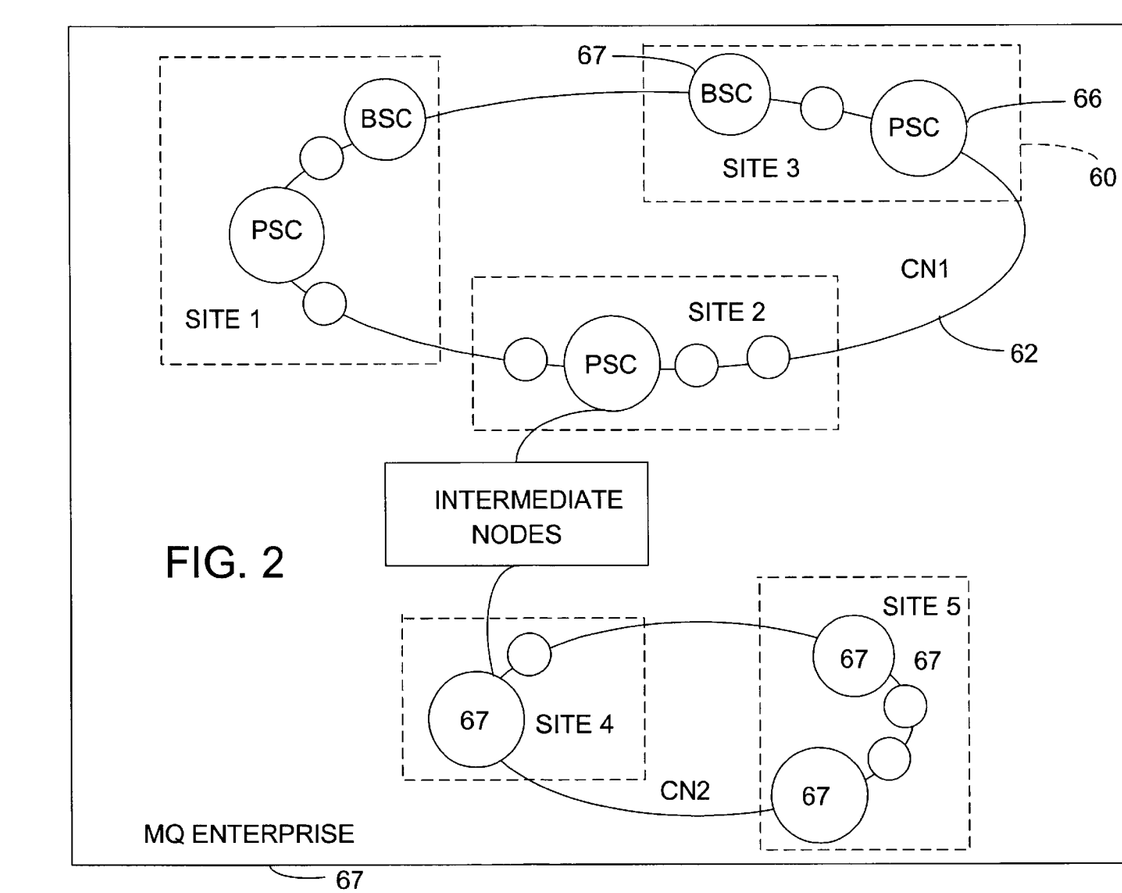
FIG. 2 is a schematic diagram showing the architecture of a message queuing system.

The present invention is directed to the access control of a message queue in a message queuing system for asynchronous message delivery. FIG. 2 shows the architecture of an embodiment of a message queuing system. In this embodiment, the grouping of the computers in the message queuing system includes three levels. On the lowest level, a group of computers which are on the same local-area network is called a "Site." The computers belonging to a Site 60 typically are networked with fast links to allow high-speed communications among the computers. On the intermediate level, a group of computers form a "Connected Network" ("CN") if every computer in the group can establish direct communication sessions with each of the other computers in the group. The computers in a Connected Network 62 need not be at the same locality and therefore may include computers belonging to different Sites. On the highest level, the collection of all interconnected Connected Networks forms an "Enterprise." In this architecture, each Site 60 is provided with a "primary site controller" ("PSC") for coordinating the message queuing operations. Within each Site 60, one or more computers, including at least the PSC 66, have a message queue (MQ) server for handling the message delivery and queuing operations. Some computers in a Site may not have their own MQ serves but may rather function as clients to use the MQ server of another computer for message queuing functionality. One of the functions of a PSC is to maintain a local database for storing data for coordinating the message queuing operations, such as data for directory information. Each Site 60 may also include one or more Backup Site Controllerd (BSC) 67 which have local database for maintaining copies of the data of the PSC of the Site for backup purposes. The PSC and BSC databases in the message queue (MQ) Enterprise 68 collectively form a distributed database for providing a directory service which is hereinafter referred to as a message queue information service (MQIS). In this distributed database, the message queue data in each local database are replicated to all other local databases. Thus, the directory information should be the same on all information servers on the PSCs or BSCs, with the exception of replication propagation delays. To maintain the integrity of the replicated database, a secured replication process should be used to ensure that the replication data are not tampered with, and that the replication is generated by an authentic MQIS server.

Figure 3:
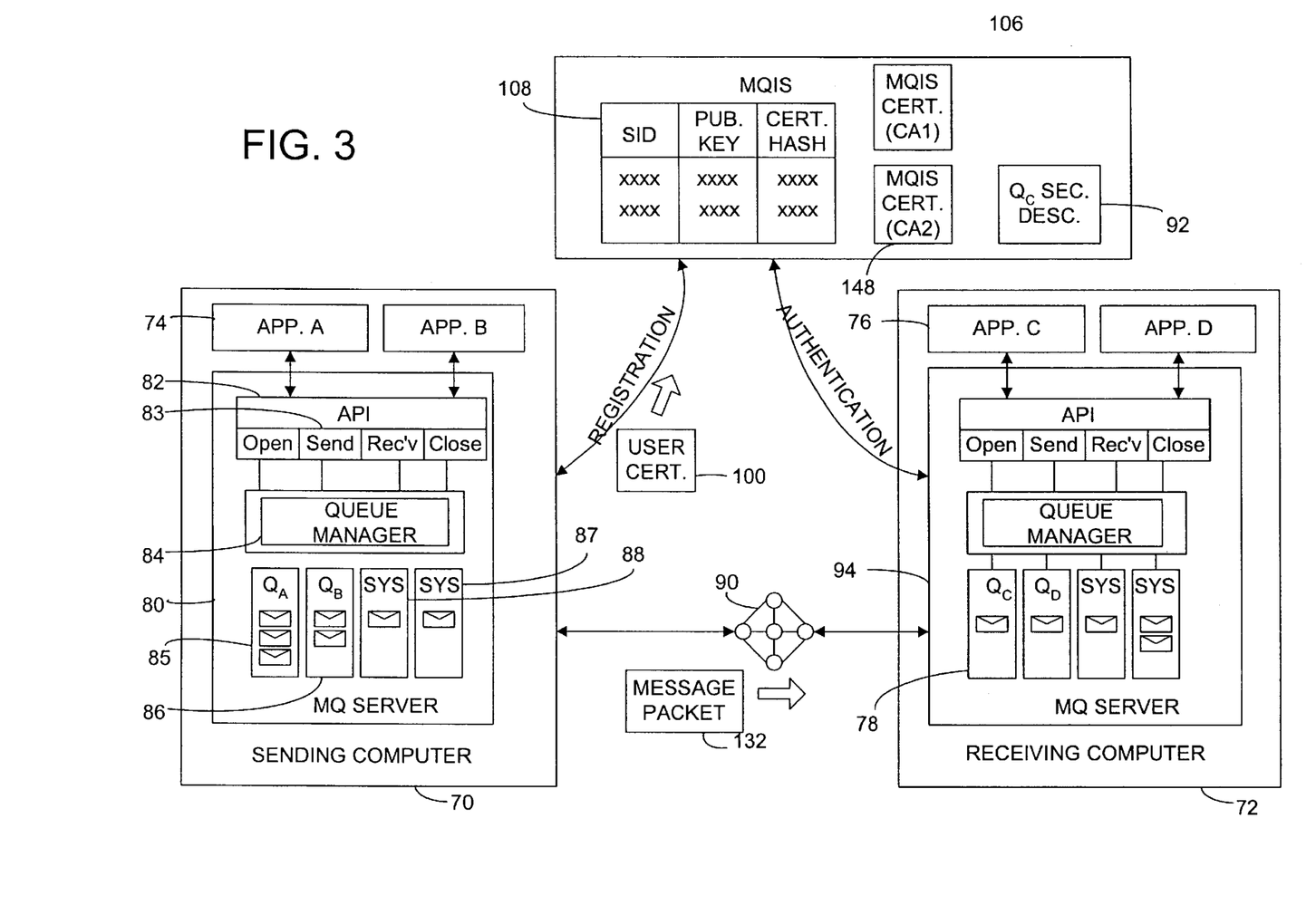
FIG. 3 is a schematic diagram showing an embodiment of the invention for the authentication of a message sent to a message queue.

Turning now to FIG. 3, the message queuing system allows an application on one machine to send a message to another application on a different machine in an asynchronous manner. For example, a user of the sending computer (or sender) 70 may run a banking application 74 to transfer money between two accounts maintained by the receiving computer (or receiver) 72. The application 74 run by the user generates a message requesting the application 76 on the receiver to execute the transaction. The message is to be delivered to a message queue for the application 76 on the receiver. In a preferred embodiment, the sending application 74 interacts with the MQ server 80 of the sender via an application programming interface (API) layer 82 which, in the illustrated embodiment, supports four message queue operations: open, send, receive, and close. A queue manager 84 of the MQ server 80 maintains a plurality of message.queues, including application queues 85, 86 and system queues 87, 88. The message to be delivered may be temporarily stored in an outgoing message queue before the MQ server 80 sends the message through the network 90 to the receiver 72.

When the message reaches the receiver 72, the MQ server 94 on the receiver computer checks the user's security identification (SID) against the security descriptor 92 for the destination queue 78 to determine whether the user or any group of which the user is a member is allowed to access the destination queue. Because a SID sent with the message may have been falsified at the sender computer or tampered with when the message traverses the network, the receiver 72 has to authenticate the SID, i.e., to confirm that the SID associated with the message is indeed that of the user who sent the message.

In accordance with a feature of the invention, the SID authentication is implemented by associating a certificate of the user with the message, and using a database of the message queuing system as a trusted entity in the authentication process. As will be described in greater detail below, the certificate may be either an internal certificate generated by the message queuing system for use only within the message queuing system for purposes of access control, or an external certificate provided by a certification authority (CA) that can be used by applications or servers for other certificate-based authentication processes.

Figure 4:
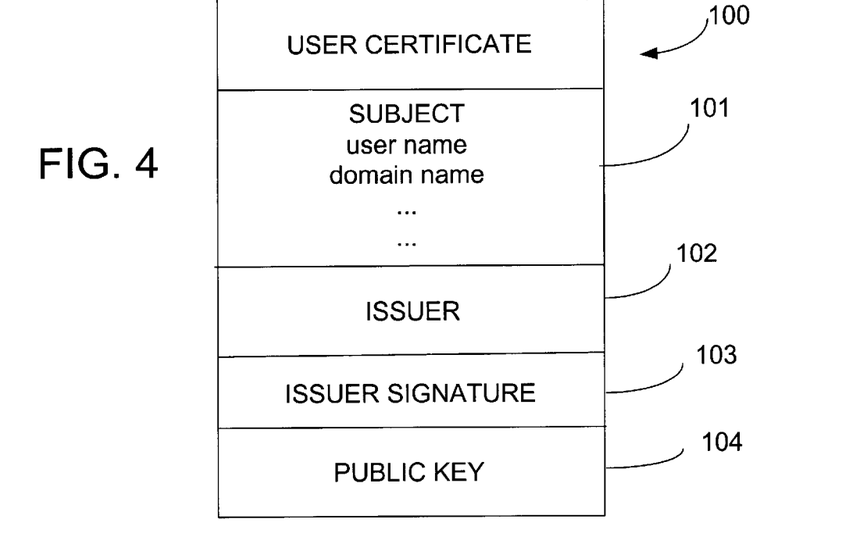
FIG. 4 is a schematic diagram showing a certificate used in the message authentication for access control of a message queue according to the invention.

FIG. 4 shows, as an example, an embodiment of a user certificate 100. The certificate preferably is constructed according to a standard certificate format, such as the X.509 standard known to those skilled in the art. In the illustrated embodiment, the certificate 100 includes multiple fields. The "subject" field 101 provides user identity information, such as the user name, domain name, account, machine, machine site, name of the MQ enterprise, etc. The "issuer" field 102 provides the identity of the issuer of the certificate, which in the case of an external certificate is the certification authority that issued the certificate. A third field 103 contains the digital signature of the certificate issuer. The fourth field 104 contains the public key of the user to whom the certificate is issued.

In accordance with an aspect of the invention, if the certificate 100 is to be used only within the message queuing system (e.g., within an MQ Enterprise), it may be an "internal" one generated by the message queuing system. In a preferred embodiment, when a user runs the control panel applet for the message queuing system for the first time, the message queuing system automatically creates for the user a pair of public and private keys and an internal certificate associated with the keys. Because the certificate is generated by the message queuing system instead of a certification authority, the subject field and the issuer field are set to be the same, and the certificate is self-signed (i.e., signed using the private key of the user). The use of internal certificates issued by the message queuing system eliminates the need for each user to obtain an external certificate from a certification authority. Alternatively, the user may select to use an external certificate issued by a certification authority for authenticating messages.

Turning back to FIG. 3, before a certificate 100 may be used for message authentication, it has to be registered with the MQIS 106. In the registration process, the MQIS 106 receives the certificate 100 from the user and obtains the user's SID from the usercredentials associated with the session established with the MQIS server for registering the certificate. The MQIS 106 stores the certificate, the SID of the user, the public key, and a hash value of the user's certificate in a table 108 which maps the SID to the user certificate.

When an application 74 sends a message and indicates that the message has to be signed for authentication purposes, a digital signature is generated using the private key associated with the certificate selected by the user for message authentication. In a preferred embodiment, the signing of the message is implemented by means of a run-time dynamic-link library (DLL) routine of the MQ Send Message API 83 which is dynamically linked to the application at run time. The functions served by the run-time DLL include communicating with the MQIS and the queue manager and signing messages sent by the application. When the application 74 calls the MQ-Send Message API 83 to send the message, the run-time DLL retrieves the private key for the selected certificate and digitally signs the message.

Figures 5, 6:
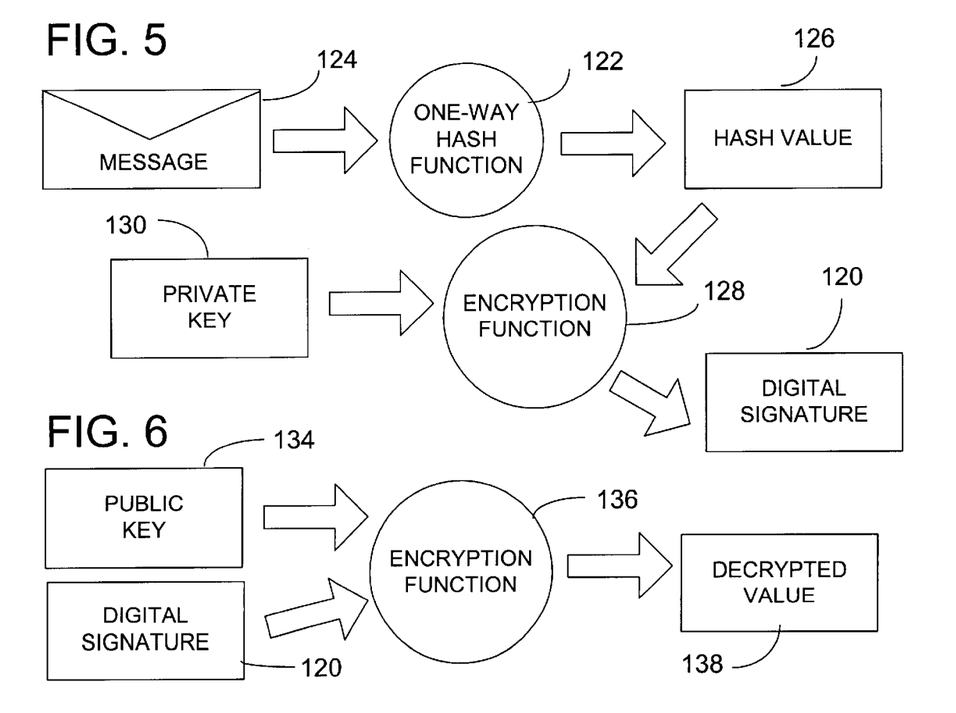
FIG. 5 is a schematic diagram showing a process of generating a digital signature for a message.
FIG. 6 is a schematic diagram showing a process of verifying digital signature of a message.

As shown in FIG. 5, the digital signature 120 of a message 124 is generated by first applying a one-way hash function 122 to the message to produce a hash value 126. The hash value 126 is then encrypted using an encryption function 128 and the private key 130 to generate the digital signature.

In a preferred embodiment, the sending MQ server sends the message together with the user's SID, the digital signature, and the user's certificate as a message packet 132 (FIG. 3) through the network to the receiver. As will be described in greater detail below, however, it is not necessary to send the user's SID with the message, because the receiving computer can obtain the SID from the MQIS. The message packet may also include information about which cryptographic procedure was used to sign the message so that the receiving server can correctly verify the signature.

Turning now to FIG. 6, when the receiver receives the message packet 132, it first verifies the digital signature that comes with the message. This is done by decrypting the digital signature 120 with a decryption function 136 and the public key 134 found in the certificate. If the decrypted value 138 is the same as the hash value 126 (FIG. 5) of the message, the signature is verified.

A verified signature indicates that the public key that comes with the certificate corresponds to the private key used to sign the message. The receiver, however, still has to verify that the received SID indeed belongs to the owner of the certificate. In accordance with a feature of the invention, a database of the message queuing system, which is the MQIS in the described embodiment, is used to confirm the association of the SID with the certificate. Referring again to FIG. 3, the receiving MQ server 94 queries the MQIS 106 to find out with which SID the received certificate is associated by sending the hash value of the certificate to the MQIS. As described above, the MQIS 106 maintains a table 108 which maps the certificate hash value to the SID. Upon receiving the query, the MQIS 106 retrieves the SID corresponding to the certificate hash value and sends the SID to the receiver.

If the SID provided by the MQIS 106 is the same as the SID found in the message packet 132, the receiving MQ server 94 is assured that the message is indeed sent by the user with the SID. The MQ server 94 then checks the security descriptor 92 for the target queue 78 to see whether the user with the SID, or any of the groups (which may be local or global) the user is a member of, is allowed to place a message in the queue. If so, the message is put in the target queue. In a preferred embodiment, the security descriptor 92 is stored at the MQIS and may be transmitted to the receiving MQ server 94 upon request.

In this message authentication process, the MQIS 106 functions as a trusted entity. Any information received from the MQIS is presumed to be true by the receiving MQ server 94. To avoid security attacks, it is important that the receiver is able to ascertain that the information is from an authentic MQIS rather than some malicious server pretending to be the MQIS. Moreover, the communications between the MQIS and the receiver should be signed (authenticated) to prevent eavesdropping.

In an embodiment of the invention, the server authentication and secured communications are implemented using the Private Communication Technology (PCT) 1.0 protocol described in *The Private Communication Technology (PCT) Protocol, IETF Internet Draft,* Benaloh et al., October 1995, which is hereby incorporated by reference. Briefly, in a handshake phase of the server authentication process, the client authenticates the server (and is optionally authenticated by the server) and selects a symmetric master key for subsequent data transmission. In the case of a new session, the handshake phase involves four messages: CLIENT_HELLO, SERVER_HELLO, CLIENT_MASTER_KEY, and SERVER_VERIFY, the first and third messages being sent by the client, and the second and fourth by the server. The CLIENT_HELLO message contains a random authentication challenge to the server and a request for the type and level of cryptography and certification to be used for the session. The SERVER_HELLO message contains a certificate of the server and a random connection identifier. The server's certificate is used by the client to authenticate the server. The CLIENT_MASTER_KEY message sent by the client includes the master key for the session (from which the session keys are derived) encrypted with the public key taken from the server's certificate. Finally, the server sends the SERVER_VERIFY message which includes a response to the client's challenge and a random session ID for the session. Since the server authentication is based on the certificate of the server, the MQIS keeps one or more external certificates 148 (FIG. 3) issued by respective certification authorities, one of which is transmitted to the receiving MQ server upon request.

Figure 7:
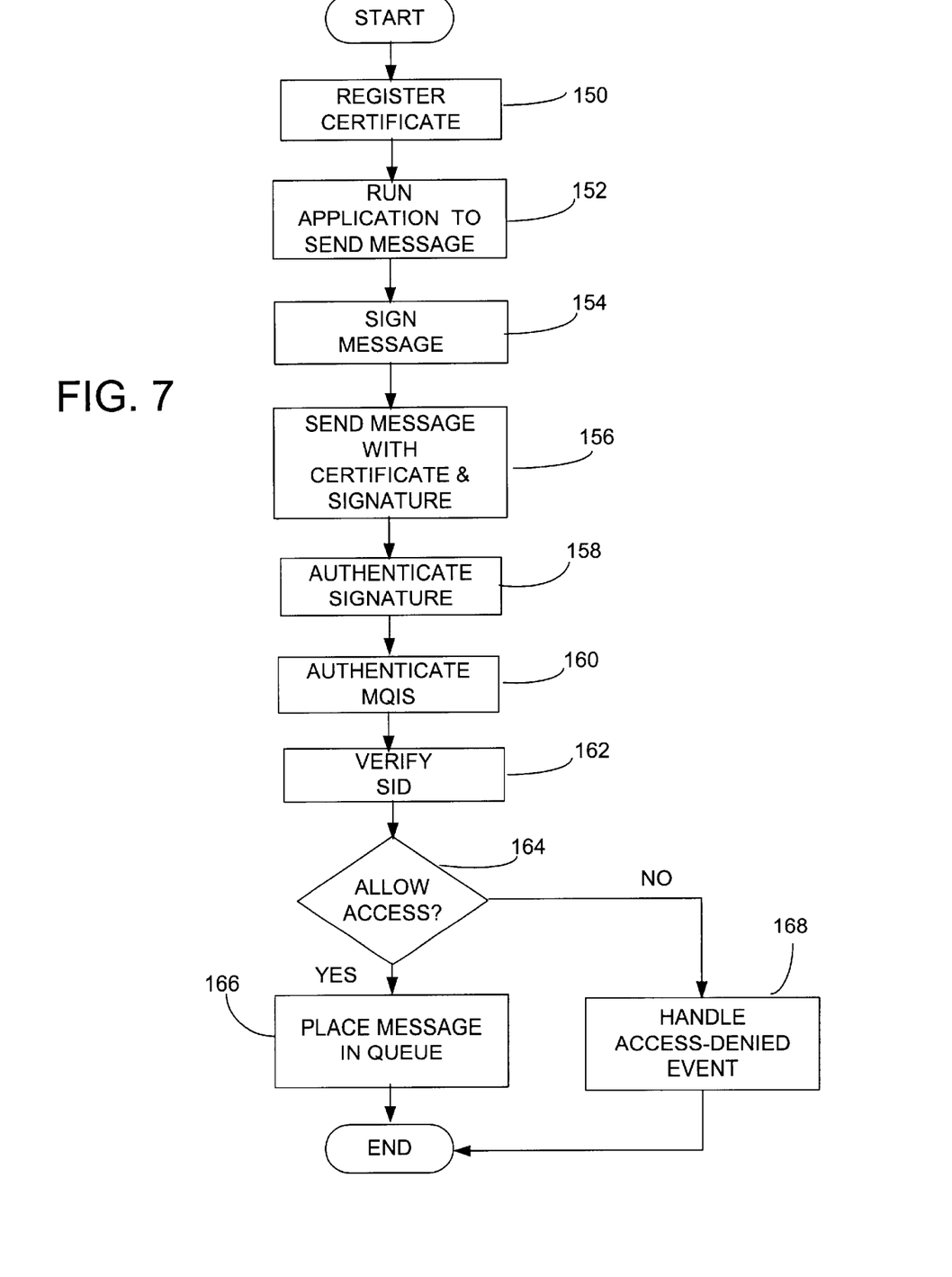
FIG. 7 is a flow chart showing steps in an embodiment of the method of the invention for message queue access control.

The message queue access control process described above is summarized in FIG. 7. To use a certificate for message authentication, the owner of the certificate registers it with a database (e.g., the MQIS) of the message-queuing network (step 150). When the user runs an application to send a message which is to be authenticated by the receiver (step 152), the MQ run-time DLL called by the application signs the message with the user's private key associated with the certificate (step 154). The message and the user's SID, the digital signature, and the certificate are then sent as a message packet to the receiving MQ server (step 156). After receiving the message, the receiving MQ server first verifies the digital signature using the public key in the certificate (step 158). If the signature is verified, the MQ server of the receiver contacts the MQIS and uses an authentication protocol to verify the identity of the MQIS (step 160). The receiving MQ server then obtains from the MQIS an SID corresponding to the received certificate and compares it with the SID that came with the message (step 162). If they match, the SID is verified. The receiving MQ server then checks the security descriptor for the target queue to see whether the user with the SID or any group of which the user is a member is allowed to access the target queue (step 164). If access is allowed, the received message is placed in the target queue for retrieval by the receiving application (step 166). If the access is denied, the MQ server handles the denied-access event (step 168). The possible handling may include (according to the message properties) sending a negative acknowledgment to the sending MQ server, placing the message in a Dead Letter Queue, etc.

In the above described embodiment, the user SID is sent with the message. This is, however, not necessary for message authentication. In an alternative embodiment, the message is sent with the certificate and the signature but without the user SID. When the receiving MQ server receives the message, it obtains the SID associated with the certificate by querying the MQIS as described above. Because the MQIS is a trusted entity, the certificate-SID mapping it provides is supposed to be true. The receiving MQ server assumes that the SID it receives from the MQIS truly identifies the person who sent the message, and checks the security descriptor for the target queue to determine whether the message with the SID should be placed in the queue.

It will be appreciated that the message authentication according to the invention as described above does not require the receiver to validate the certificate (based on the validity period, CA signature, etc.) that is sent together with the message. The only information in the certificate that the MQ server of the receiver is interested in is the public key. For an authenticated message, the MQ server of the receiver vouches for the correctness of the mapping from the certificate to the SID of the user who registered the certificate, but not the correctness of other information in the certificate. In one possible embodiment of the invention, the certificate may contain only the public key of the user. It is, however, preferable to use certificates constructed according to a commonly used certificate format. The use of a standard certificate format allows a user to use external certificates issued by certification authorities to authenticate messages. With an external certificate, the receiving application (as opposed to the MQ server) can independently identify the user who sent the message not only by the SID associated with the message but also by the information found in the certificate. In other words, the inclusion of external certificates with messages allows other applications or servers to apply certificate-based security to the messages.

Figure 8:
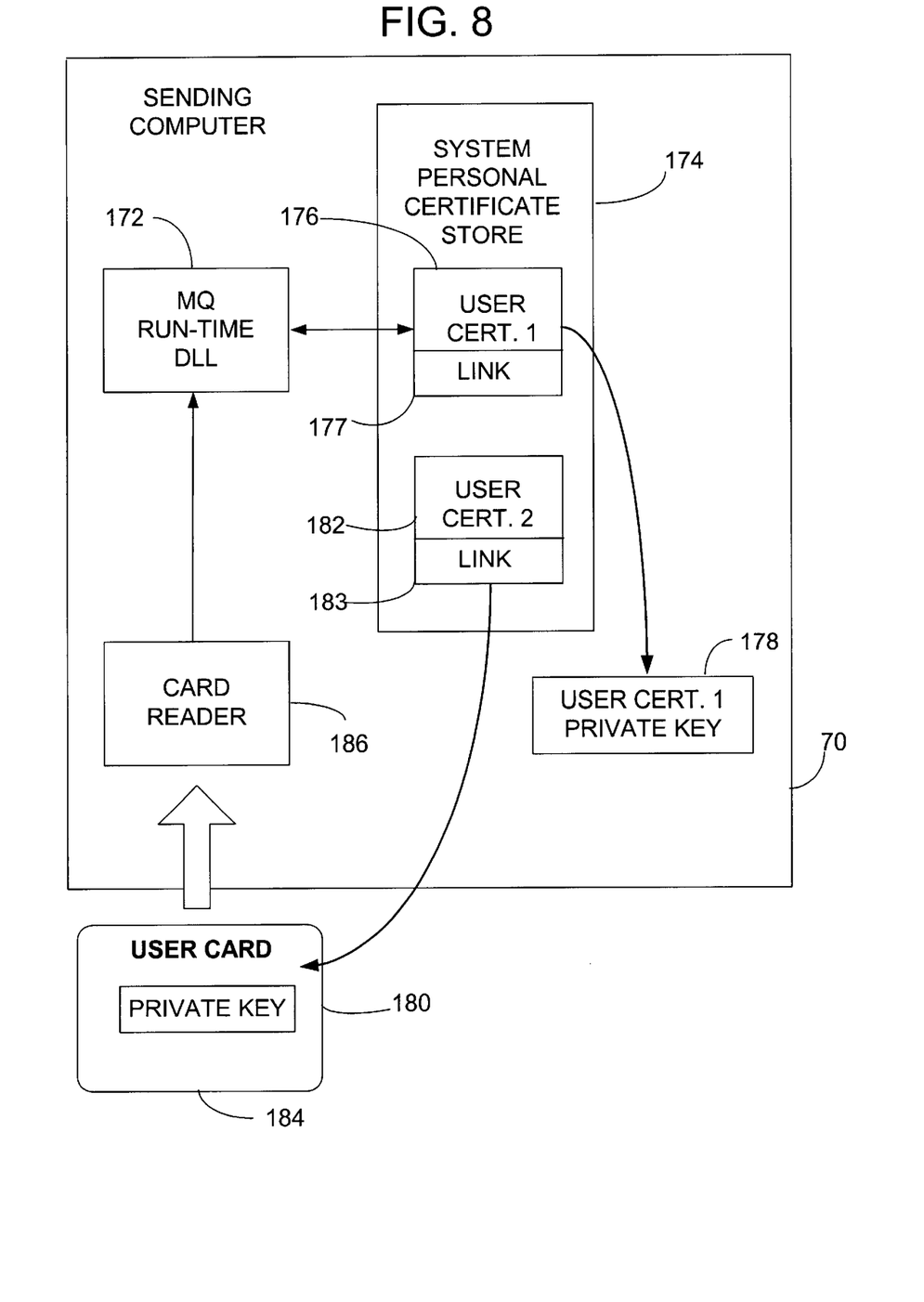
FIG. 8 is a schematic diagram showing an arrangement for the storage and retrieval of a private key for use in message queue access control.

To digitally sign a message, the run-time MQ DLL of the sending machine has to be able to locate the private key associated with the user certificate to be transmitted with the message. Since the message queuing system manages the internal certificates, it knows where the private key associated with each internal certificate is stored. If an external certificate is to be used, however, a convention is required for the MQ run-time DLL to locate the private key associated with the external certificate. In a preferred embodiment, the message queue security is integrated with a system personal certificate store. Referring to FIG. 8, the certificates of a user are stored in the system personal certificate store 174. For each certificate 176, the certificate store 174 keeps a link 177 which indicates the location of the private key 178 associated with the certificate. The link 177 also specifies which cryptographic routine is to be used to perform the cryptographic operations of signing messages and verifying signatures. In one implementation, when a certificate obtained using an Internet web browser is put in the system certificate store, the private key is placed in the system registry. To sign a message, the MQ run-time DLL 172 accesses the certificate store 174 to obtain the certificate 176 selected by the user, retrieves the private key 178 according to the link 177, and uses the cryptographic routine to generate a digital signature for the message using the private key.

In an alternative arrangement which is also shown in FIG. 8, the private key 180 for the user certificate 182 may be stored on a machine-readable card 184 held by the user, and the link 183 stored with the certificate 182 in the certificate store points to the private key 180 on the card. The sending computer 70 is provided with a card reader 186 for reading the private key on the card and the appropriate cryptographic procedure for generating the digital signature. Since supposedly only the user has access to the card, the use of the card provides an additional layer of security. When the user runs an application to send a message that is to be signed, the MQ run-time DLL looks up the certificate in the certificate store and finds the link to the card and information about the cryptographic procedure that interfaces with the card. The cryptographic routine may prompt the user to input the private key by using the card reader 186 to read the card 184. The cryptographic routine then signs the message with the private key.

It will be appreciated by those skilled in the art that the arrangements for the storage and retrieval of the private key described above are provided only as examples. With a given certificate for message authentication, there are many other alternative ways, which may employ special hardware devices or software, for retrieving the private key and generating the digital signature. Such alternative ways may be used in the message authentication without deviating from the spirit and scope of the invention.

In view of the foregoing detailed description, it can be appreciated that the present invention provides a method and system for access control of message queues in a message queuing system for asynchronous communications. The access control of the invention implements certificate-based message authentication and uses a database of the message queuing system as a trusted entity in the authentication process. The certificates used may be internal certificates generated by the message queuing system. The use of internal certificates provides significant convenience to the user. Alternatively, the user may select to use an external certificate issued by a certification authority, which provides compatibility with other certificate-based authentication operations.

What is claimed is:

1. A method of controlling access to a message queue of a receiver in a message queuing system with asynchronous message delivery, comprising the steps of:

registering with a trusted server of the message queuing system a public key of a user of the message queuing system associated with a security identification (SID) of the user for identifying the user, the trusted server being a separate entity from the receiver;

forming a digital signature for a message generated by an application run by the user using a private key associated with the public key of the user;

transmitting to the receiver a message packet including the message, the public key of the user, and the digital signature;

verifying, by the receiver, the signature transmitted with the message using the received public key;

querying, by the receiver, the trusted server to obtain the SID associated with the public key transmitted with the message; and determining whether to allow the message to be placed in a message queue of the receiver based on the obtained SID.

2. A method as in claim 1, wherein the trusted server is a replicated database.

3. A method as in claim 2, wherein the replicated database provides directory service.

4. A method as in claim 1, wherein the public key is generated by the message queuing system.

5. A method as in claim 1, wherein the public key is issued by a certification authority.

6. A method as in claim 1, further including the step of authenticating the trusted server by the receiver.

7. A method as in claim 6, wherein the step of authenticating the trusted server includes transmitting a certificate of the trusted server issued by a certification authority to the receiver.

8. A method as in claim 1, further including the step of storing the public key with information on a location of the private key and a cryptographic procedure for signing the message.

9. A method as in claim 8, further including the step of retrieving the private key of the user from a card.

10. A method as in claim 1, wherein the step of determining includes checking a security descriptor for the message queue of the receiver.

11. A computer-readable medium having computer-executable instructions for performing the steps recited in claim 1.

12. A message queuing system for asynchronous delivery of a message from a sender to an access-controlled message queue of a receiver, comprising:

a trusted server for registering a public key of a user and storing a corresponding security identification (SID) of the user for identifying the user, the trusted server being a separate entity from the receiver;

a routine for generating a digital signature for a message sent by an application run by the user using a private key associated with the public key;

a message queue server of the sender for transmitting the message with the public key and the digital signature to the receiver; and a message queue server of the receiver for verifying the digital signature using the received public key, querying the trusted server to obtain the SID corresponding to the public key, and determining whether to allow the message to be placed in a message queue of the receiver based on the obtained SID.

13. A message queuing system as in claim 12, wherein the trusted server is a replicated database for providing distributed directory service.

14. A message queuing system as in claim 12, further including a security descriptor for the message queue for checking by the message queue server of the receiver for determining whether to allow the message to be placed in the message queue of the receiver.

15. A message queuing system as in claim 13, further including a store for storing the public key with information on a location of the private key associated with the public key and a cryptographic procedure for signing the message.

16. A message queuing system as in claim 12, further including a machine readable card on which the private key of the user is stored, and wherein the sender includes a card reader for reading the card to retrieve the private key.

17. A message queuing system as in claim 12, wherein the public key of the user is generated by the message queuing system.

18. A message queuing system as in claim 12, wherein the trusted server includes an external certificate issued by a certification authority for authentication thereof by the receiver.

19. A computer-readable medium having computer-executable components comprising:

a trusted server component for registering a public key of a user and storing a corresponding security identification (SID) of the user for identifying the user;

a signing component for generating a digital signature for a message sent by an application run by the user using a private key associated with the public key;

a sending message queue server component for transmitting the message with the public key and the digital signature to the receiver; and a receiving message queue server component for verifying the digital signature using the received public key, querying the trusted server to obtain the SID corresponding to the public key, and determining whether to allow the message to be placed in a message queue of the receiver based on the obtained SID, the trusted server being a separate entity from the receiving message queue server.

20. A method of controlling access to a message queue of a receiver in a message queuing system with asynchronous message delivery, comprising the steps of:

receiving a message from a sender of the message queuing system to a destination message queue, the message sent with a public key of a user sending the message and a digital signature of the message formed with a private key associated with the public key;

verifying, by the receiver, the signature transmitted with the message using the received public key;

querying, by the receiver, a trusted server of the message queuing system to obtain a security identification (SID) corresponding to the public key received by the receiver and identifying a user sending the message, the trusted server being a separate entity from the receiver; and checking a security descriptor for the destination queue to determine whether the message is allowed to be placed in the destination message queue based on the obtained SID.

21. A method as in claim 20, further including the step of transmitting a certificate of the database to the receiver for authenticating the database by the receiver.

22. A method as in claim 21, further including the step of generating the certificate by the message queuing system for the user.

23. A method as in claim 20, further including the step of reading the private key from a card for forming the digital signature.

24. A computer-readable medium having computer-executable instructions for performing the steps recited in claim 20.

* * * * *

UNITED STATES PATENT AND TRADEMARK OFFICE
CERTIFICATE OF CORRECTION

PATENT NO.    : 6,446,206 B1
DATED         : September 3, 2002
INVENTOR(S)   : Boaz Feldbaum

It is certified that error appears in the above-identified patent and that said Letters Patent is hereby corrected as shown below:

<u>Column 5,</u>
Line 24, "Controllerd" should read -- Controllers --.

<u>Column 12,</u>
Line 43, "claim 21" should read -- claim 20 --.

Signed and Sealed this

Nineteenth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,446,206 B1  Page 1 of 1
DATED : September 3, 2002
INVENTOR(S) : Boaz Feldbaum It is certified that error appears in the above-identified patent and that said Letters Patent is hereby corrected as shown below:

Title page,
Item [56], References Cited, U.S. PATENT DOCUMENTS, insert the following:
-- 5,072,370  12/1991  Durdik
   5,432,715  7/1995   Shigematsu et al.
   5,491,791  2/1996   Glowny et al.
   5,768,614  6/1998   Takagi et al.
   5,781,703  7/1998   Desai et al.
   5,870,540  2/1999   Wang et al.
   6,088,816  7/2000   Nouri et al.
   6,154,128  11/2000  Wookey et al.
   6,167,358  12/2000  Othmer et al.
   6,173,422  1/2001   Kimura et al. --

Signed and Sealed this

Eleventh Day of May, 2004

JON W. DUDAS
*Acting Director of the United States Patent and Trademark Office*